(12) United States Patent
Sugahara

(10) Patent No.: US 7,593,123 B2
(45) Date of Patent: Sep. 22, 2009

(54) PRINTING SYSTEM FOR GROUPING PRINTING APPARATUSES

(75) Inventor: Yoshinori Sugahara, Itami (JP)

(73) Assignee: Minolta Co., Ltd., Osaka (JP)

( * ) Notice: Subject to any disclaimer, the term of this patent is extended or adjusted under 35 U.S.C. 154(b) by 72 days.

(21) Appl. No.: 11/345,290

(22) Filed: Feb. 2, 2006

(65) Prior Publication Data

US 2006/0126115 A1 Jun. 15, 2006

Related U.S. Application Data

(62) Division of application No. 09/537,294, filed on Mar. 29, 2000, now Pat. No. 7,027,169.

(30) Foreign Application Priority Data

Mar. 31, 1999 (JP) ................................ 11-92650
Apr. 8, 1999 (JP) ................................ 11-101225

(51) Int. Cl.
*G06F 15/00* (2006.01)
*G06F 3/12* (2006.01)
*G06K 15/00* (2006.01)
(52) U.S. Cl. .................................... 358/1.14; 358/1.15
(58) Field of Classification Search ................ 358/1.14, 358/1.15, 1.13, 1.1
See application file for complete search history.

(56) References Cited

U.S. PATENT DOCUMENTS

| 5,625,757 | A | 4/1997 | Kageyama et al. |
| 5,982,994 | A | 11/1999 | Mori et al. |
| 6,088,120 | A | 7/2000 | Shibusawa et al. |
| 6,292,267 | B1 | 9/2001 | Mori et al. |
| 6,369,909 | B1 * | 4/2002 | Shima ..................... 358/1.15 |
| 6,577,407 | B1 * | 6/2003 | Kopecki .................. 358/1.15 |
| 6,804,019 | B2 | 10/2004 | Shiohara |

FOREIGN PATENT DOCUMENTS

JP 3065720 3/1991

(Continued)

OTHER PUBLICATIONS

English translation of Japanese Office Action dated May 31, 2005, from corresponding application No. H11-092650.

(Continued)

*Primary Examiner*—Douglas Q Tran
(74) *Attorney, Agent, or Firm*—Morrison & Foerster LLP

(57) ABSTRACT

In order to carry out a printing operation without waiting for a while in the case in which a printing device receiving printing job data cannot execute the printing operation for some reason, a plurality of printing devices (100) which are network-connected are formed into groups based on a processable language and one of the printing devices belonging to the same language group is caused to act as a managing printing device. The managing printing device receives a status signal from all the printing devices belonging to the same language group, and distributes the printing job data transmitted from the printing device to the other printing devices belonging to the same language group when any of the printing devices cannot carry out the printing operation. In this case, one printing device for supporting a plurality of languages can be set as a managing printing device which is common to each group.

33 Claims, 13 Drawing Sheets

FOREIGN PATENT DOCUMENTS

| | | |
|---|---|---|
| JP | 5-158639 | 6/1993 |
| JP | 5-324224 | 12/1993 |
| JP | 6-4239 | 1/1994 |
| JP | 6-21964 | 1/1994 |
| JP | 6-35634 | 2/1994 |
| JP | 6-59833 | 3/1994 |
| JP | 6-103004 | 4/1994 |
| JP | 6-242899 | 9/1994 |
| JP | 7-141128 | 6/1995 |
| JP | 7141132 | 6/1995 |
| JP | 7-219730 | 8/1995 |
| JP | 7-306764 | 11/1995 |
| JP | 7-311665 | 11/1995 |
| JP | 8-221234 | 8/1996 |
| JP | 9-185471 | 7/1997 |
| JP | 9-190312 | 7/1997 |
| JP | 9198217 | 7/1997 |
| JP | 10-40037 | 2/1998 |

OTHER PUBLICATIONS

Japanese Office Action mailed on Aug. 19, 2008 directed towards counterpart foreign application No. 11-101225; 6 pages.

* cited by examiner

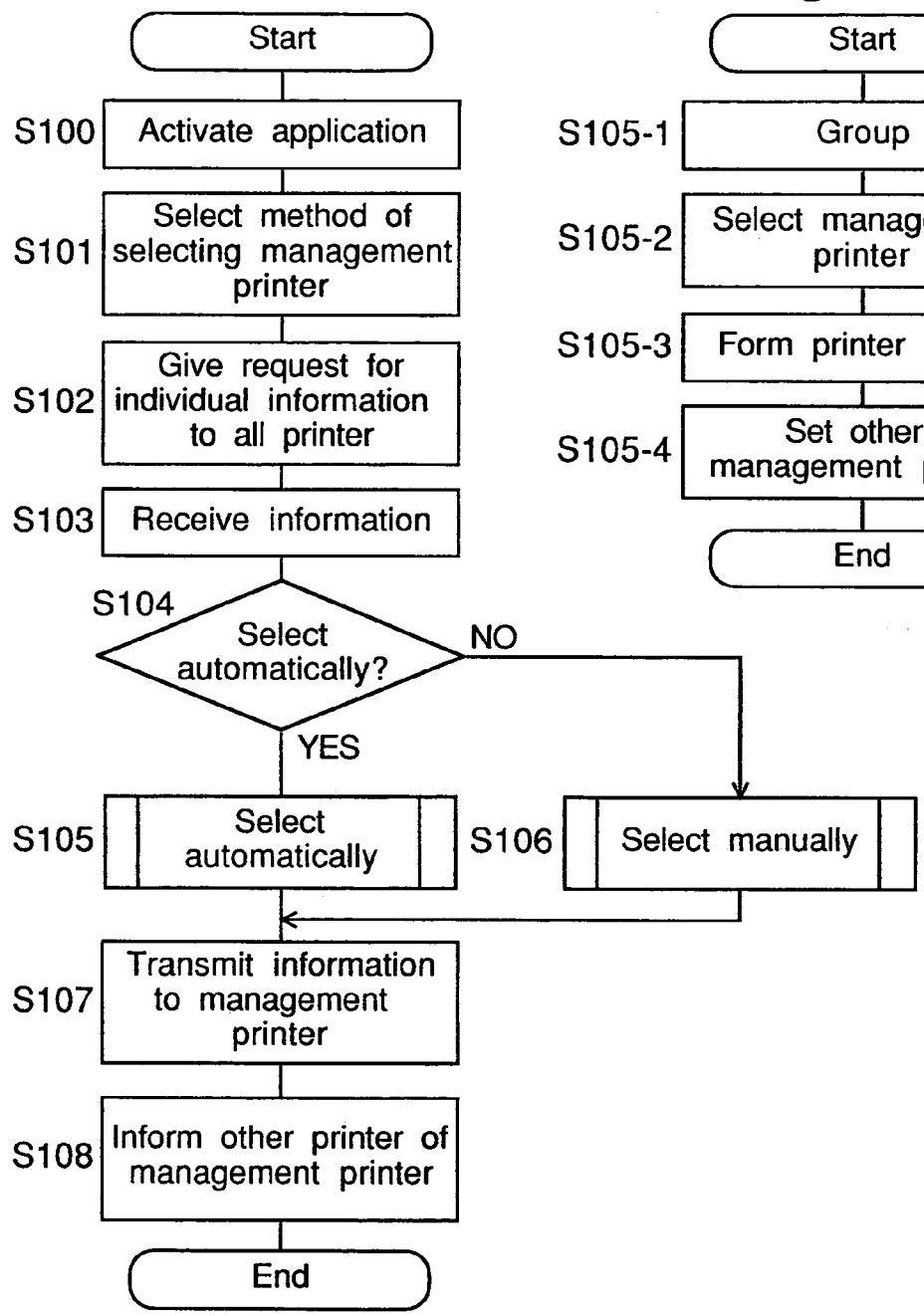

Fig.12

| | printer language | color · black and white | paper | resolution | memory capacity | font | printing speed | printing execution | note |
|---|---|---|---|---|---|---|---|---|---|
| printer1 | PCL6 | color | A4/A3 | 1200dpi | 32MB | — | 3ppm | NO | |
| printer2 | PCL6 | black and white | A4/A3 | 1200dpi | 32MB | — | 20ppm | NO | |
| printer3 | PCL5e | color | A4 | 600dpi | 16MB | — | 3ppm | YES | |
| printer4 | PCL5e | black and white | A3 | 600dpi | 16MB | — | 8ppm | NO | |
| printer5 | PCL5e | black and white | A4/A3 | 600dpi | 32MB | — | 16ppm | NO | |
| printer6 | PCL6 | black and white | A4 | 1200dpi | 16MB | — | 16ppm | NO | |
| printer7 | PCL6 | black and white | A4 | 600dpi | 8MB | — | 20ppm | YES | |
| printer8 | PCL6 | black and white | A4 | 600dpi | 16MB | — | 8ppm | NO | |
| printer9 | PCL5e | black and white | A4 | 600dpi | 8MB | — | 8ppm | NO | |

PRINTING SYSTEM FOR GROUPING PRINTING APPARATUSES

REFERENCE TO RELATED APPLICATIONS

This application is a division of Ser. No. 09/537,294, field Mar. 29, 2000, now U.S. Pat. No. 7,027,169, which is based on Japanese Patent Application Nos. 11-92650 and 11-101225 filed in Japan, the contents of which is hereby incorporated by reference.

BACKGROUND OF THE INVENTION

1. Field of the Invention

The present invention relates to a printing system, and more particularly to a system capable of carrying out a printing operation without waiting for a while if a printing device (hereinafter referred to as a printer) receiving printing job data cannot execute the printing operation due to some reason.

2. Description of the Related Art

In recent years, there has been proposed a printing system in which a plurality of host computers and a plurality of printers are connected through a network line and a printing operation can be executed when printing job data is transmitted from any of the host computers to one of the printers.

For example, there has been known a printing system in which a printer having the function and performance desired by a user is automatically selected from a plurality of printers by means of a host computer or a printer managing device (see Japanese Patent Laid-Open Publications Nos. 6-242899 and 7-141128).

However, the above-mentioned conventional printing system has had the following problem. More specifically, if one of the printers is specified to transmit printing job data and a large number of printing jobs have had been cued in the printer, the next printing operation cannot be carried out until the processing is completed. Therefore, it takes a long time to complete the printing operation.

SUMMARY OF THE INVENTION

In consideration of such a problem, it is an object of the present invention to provide a printing system capable of carrying out a printing operation without waiting for a while even if printing jobs are concentrated in a printer.

The present invention provides a printing system in which a plurality of printing devices are connected to each other through a network line and printing job data transmitted from a data processing device is received by the printing devices to carry out a printing operation, the printing system comprising at least printing means for causing the printing devices to execute a printing operation based on the printing job data, communicating means for transmitting and receiving data together with the other printing devices and storing means for storing device information of the other printing devices, wherein the printing devices are formed into groups based on a processable language, one of the printing devices belonging to the same language group is caused to act as a managing printing device, device information of all the printing devices belonging to a language group which can be processed by the managing printing device are stored, and job data is transferred to the other printing devices belonging to the same language group when the job data is transferred from any of the printing devices.

The present invention is characterized in that a managing printer for supporting at least two printer languages is provided and the managing printer transfers the printing job data to the other printers belonging to the same language group so as to execute a printing operation if the printer receiving the printing job data cannot execute the printing operation for some reason. Consequently, in the case in which a large number of printing jobs are cued in one printer or printer errors are made and the shortage of a paper or the like is caused, the printing operation can be executed without waiting for a while. If a host computer investigates a network environment to examine the performance, conditions and the like of each printer, thereby automatically selecting the managing printer, an optimum printer according to various conditions can be selected from the network environment.

Moreover, the printers for supporting a language which can be processed are previously formed into groups for storage by the managing printer. Therefore, the allotment of the printing job data can be carried out more efficiently than the case in which a printer desired by a user is selected by the host computer or the printer managing device to transmit the printing job data. In addition, the user does not need to confirm the state of the printer.

The managing printer may be automatically selected by the host computer (data processing device).

More specifically, the data processing device may include automatic selecting means for processing at least two languages from the device information of the printing devices and selecting, as the managing printing device, a printing device having a high data processing capability, grouping means for forming the printing devices into groups based on the language which can be processed by the managing printing device, and communicating means for transmitting the device information of the printing device belonging to a processable language group to the managing printing device and informing the printing device other than the managing printing device of a managing device of a language group to which the printing device itself belongs.

Furthermore, when the managing printer is selected by the host computer, the task processing of the host computer itself is heavy, the managing printer can be selected by provisionally performing the user's manual operation in place of the automatic selection by the host computer in the case in which the processing capability is reduced or troubles are made on the network. Thus, flexible countermeasures can be taken.

More specifically, the data processing device may further include manual selecting means capable of optionally selecting a managing printing device from the device information of the printing devices by the user's operation.

Moreover, it is preferable that the other printers to transfer the printing job data from the managing printer should belong to the same language group. For example, the printing job data can also be transferred to a printer having a high data processing capability. However, in the case in which the printing job data should be newly transferred after the transfer of the printing job data and the printing job data requires a high data processing capability, a printer having a low data processing capability cannot be applied. Therefore, it is preferable that the printer to transfer the printing job data should be sequentially selected from the printers having a lower data processing capability.

More specifically, it is preferable that the managing printing device should transfer the printing job data from any of the printing devices to one of the printing devices belonging to the same language group and having the lowest data processing capability when the printing job data is transferred.

Furthermore, the printer to be used for the printing system described above is also novel. According to the present invention, it is possible to provide a printing device to be used for a printing system in which a plurality of printing devices are connected to each other through a network line and to receive printing job data from a data processing device, thereby carrying out a printing operation, the printing device comprising printing means for executing the printing operation based on the printing job data, storing means for storing device information of the other printing devices which can process a language common to a self-processable language when the printing device itself is selected as a managing printing device and for storing a self managing printing device when the printing device itself is not the managing printing device, and communicating means for transferring the printing job data to the managing printing device in such a situation that the printing operation cannot be carried out when the printing device itself is not the managing printing device and for transferring the printing job data to the selected printing device when the printing device itself is the managing printing device.

Any data processing device for processing a signal and outputting printing job data can be used. In general, a host computer is used one data processing device or more may be provided. The data processing device and the printer may be connected through any means, and can be connected to each other through a network line, for example.

This object as well as other objects, features and advantages of the invention will become more apparent to those skilled in the art from the following description with reference to the accompanying drawings.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which:

FIGS. 6A and 6B are flowcharts showing a processing of selecting the managing printer and an automatic selecting processing according to the first embodiment, respectively;

FIG. 12 is a diagram showing an example of the procedure for determining the transfer destination printer of printing job data according to the first embodiment;

DETAILED DESCRIPTION OF THE PREFERRED EMBODIMENTS

Figure 1:
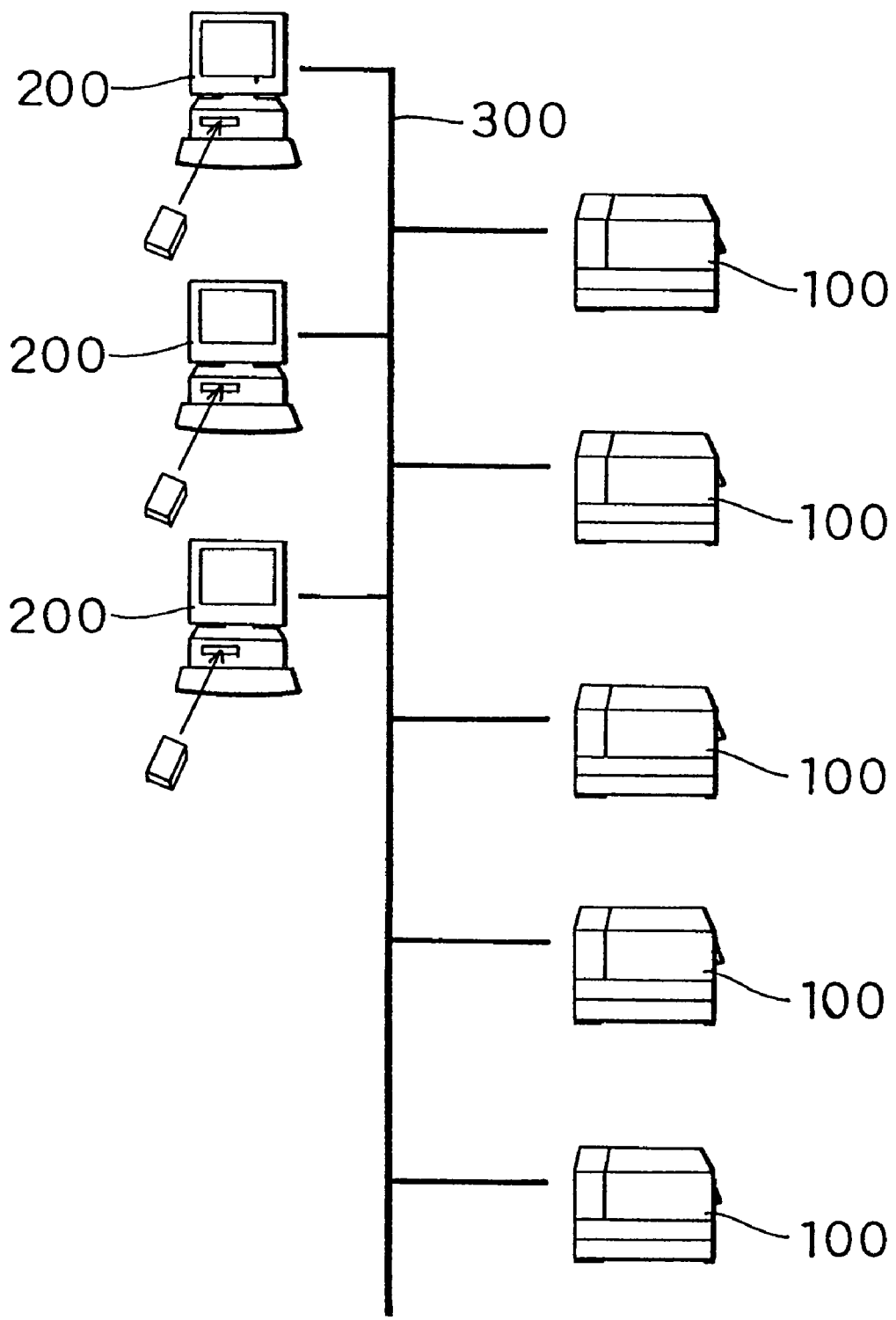
FIG. 1 is a view showing the structure of a printing system according to a first embodiment of the present invention.

A specific example of the present invention will be described below in detail with reference to the drawings. FIGS. 1 to 6 show a preferred embodiment of a printing system according to the present invention. FIG. 1 shows the whole structure of the printing system according to the present example. In FIG. 1, the printing system according to the present example has a structure in which a plurality of printers (printing devices) 100 . . . and a plurality of host computers (data processing devices) 200 . . . are connected through a network line 300, and printing job data can be transmitted and printed on the printer 100 from any of the host computers 200 . . . .

Figure 2:
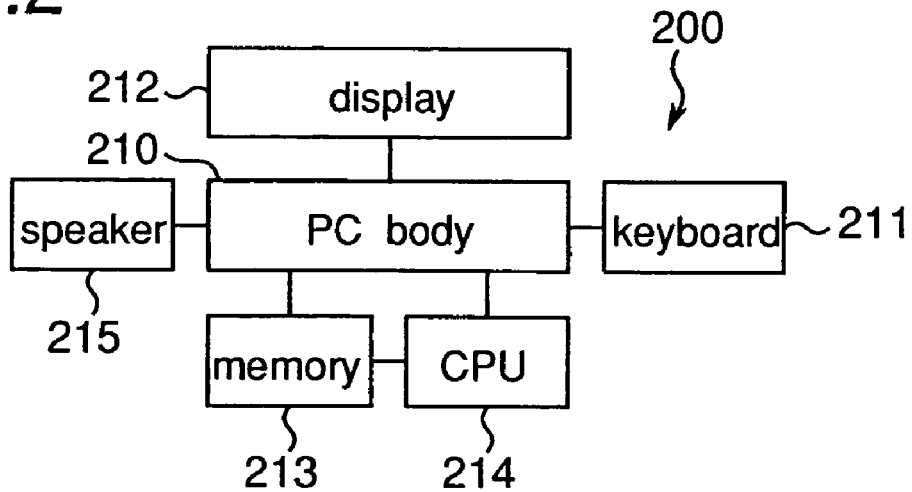
FIG. 2 is a functional block diagram showing the structure of a host computer according to the first embodiment.

FIG. 2 shows the functional block of the host computer 200. The host computer 200 includes a personal computer body (communicating means) 210, a keyboard (manual selecting means) 211 for carrying out various setting and indicating operations, a display 212 for carrying out display, a memory 213 for holding the contents of registration, a CPU (manual selecting means, grouping means, automatic selecting means) 214 for executing various operations, and a speaker 215 for outputting a voice.

Figure 3:
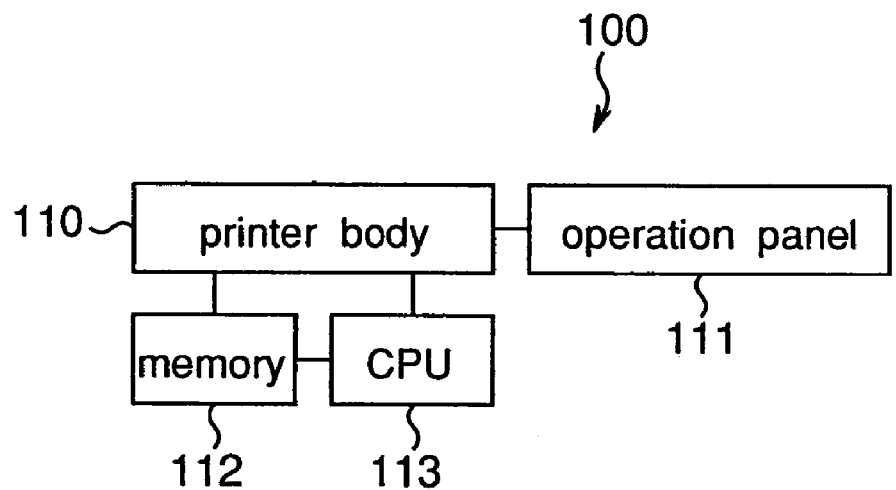
FIG. 3 is a functional block diagram showing the structure of a printer according to the first embodiment.

FIG. 3 shows the functional block of the printer 100. The printer 100 includes a printer body (printing means, communicating means) 110, an operation panel (selecting means) 111 for carrying out various setting and display operations, a memory (storing means) 112 for holding the contents of registration, and a CPU (selecting means) 113 for executing a processing.

Figure 4:
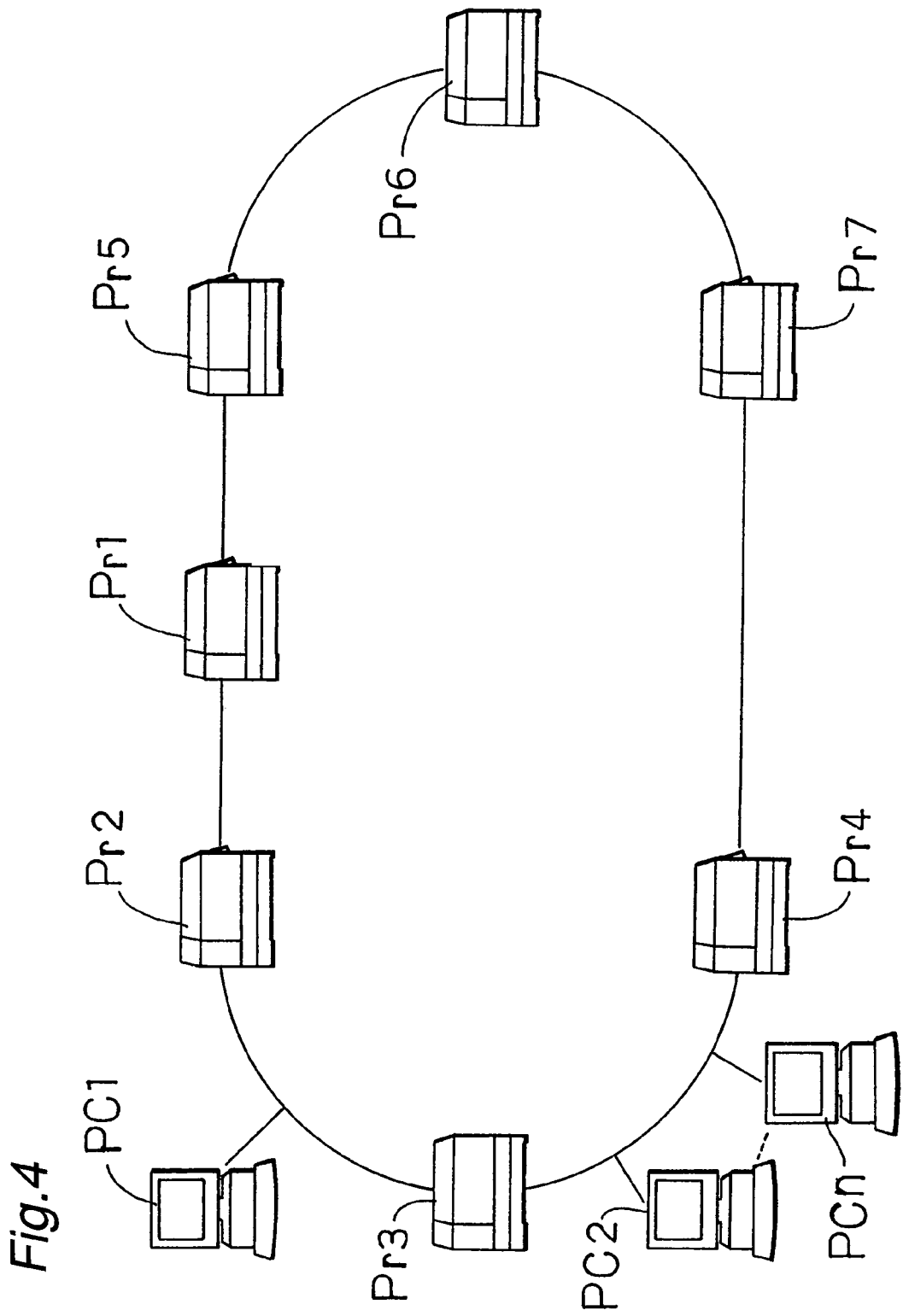
FIG. 4 is a view showing the conceptual structure of the system according to the first embodiment.

FIG. 4 conceptually shows the printing system according to the present example. The printers 100 . . . are annularly connected through the network line, while the host computers 200 . . . are connected to the network line. In FIG. 4, the printer is indicated as Pr 1 to Pr 7 and the host computer 200 is indicated as Pc 1 to Pc n.

Next, description will be given to the outline of a selecting processing to be executed by a managing printer and a processing of transferring printing job data with reference to FIGS. 4 and 5. In the case in which the managing printer is to be selected, an application software for selecting the managing printer is first activated in any of the host computers Pc 1 to Pc n connected onto the network to obtain the device information of each of the printers Pr 1 to Pr 7 on the network. The device information includes a printer language, a resolution, color or black and white, a printing speed, a paper size, a font, a job execution status, a memory capacity and the like.

Next, the host computers Pc 1 to Pc n select the optimum managing printer Pr 1 from the device information. By the selection, the printer Pr 1 capable of processing two different languages (for example, PCL and PS) is caused to act as a managing printer, the printers Pr 2 to Pr 4 belonging to the language PCL are allocated to one language group and the printers Pr 5 to Pr 7 belonging to the language PS are allocated to another language group, thereby forming a printer group.

Figure 5:
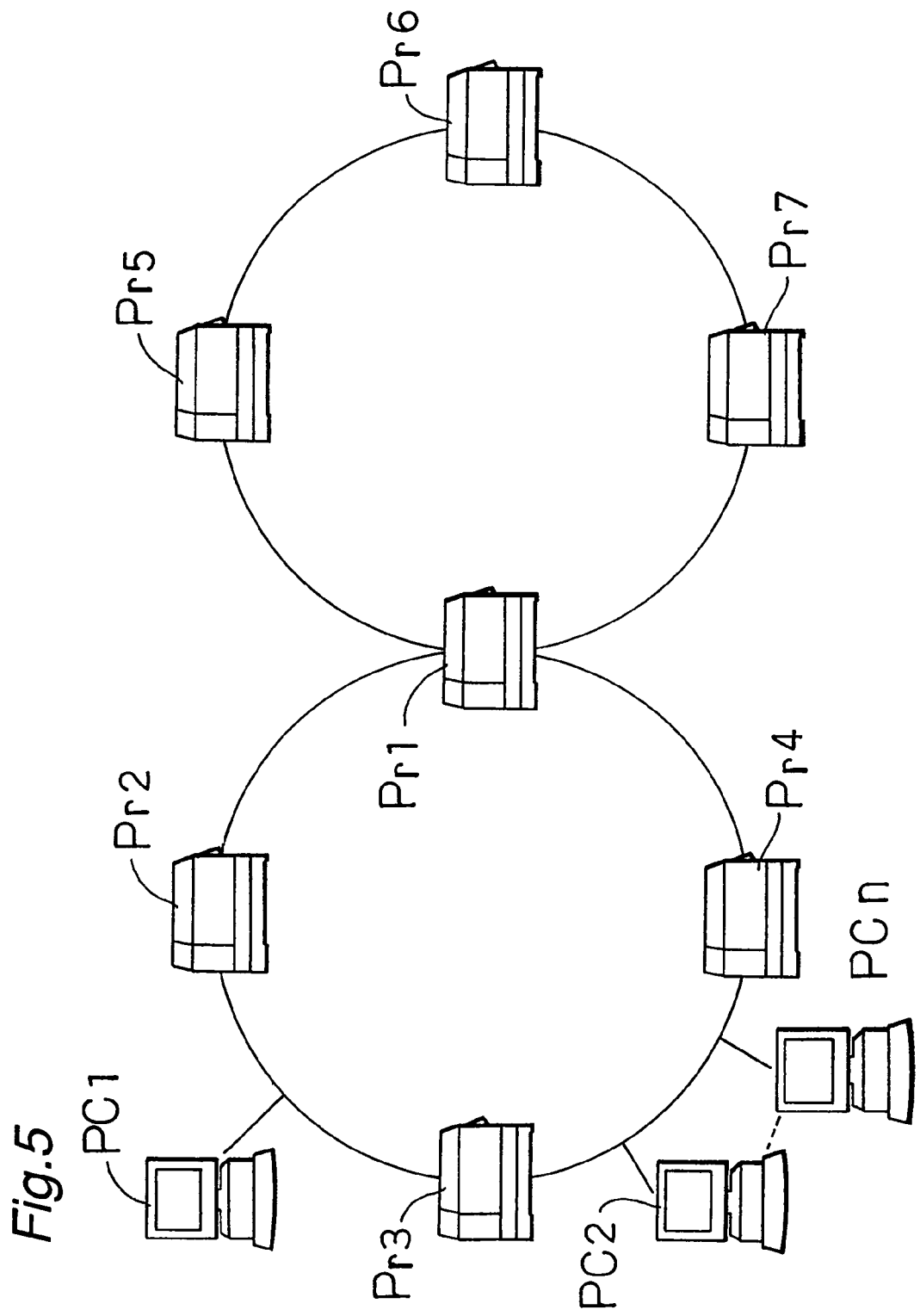
FIG. 5 is a conceptual view showing a state in which the system is formed into groups by using a managing printer as a center.

FIG. 5 conceptually shows a state in which the groups are formed as described above. In an example, the printer Pr 1 is selected as the managing printer. By using the managing Pr 1 as a center, a group of the printers Pr 2, Pr 3 and Pr 4 for one language (for example, PCL) and a group of the printers Pr 5, Pr 6 and Pr 7 for another language (for example, PS) are formed. Moreover, the device information of each of the printers Pr 2 to Pr 7 on the network are always held by the managing printer Pr 1. If the device information is changed, the printers Pr 2 to Pr 7 inform the managing printer Pr 1 of the change of the device information at any time.

When the managing printer Pr 1 is selected as described above, the host computers Pc 1 to Pc n inform each of the printers Pr 2 to Pr 7 that the printer Pr 1 is the managing printer, while it transfers the device information of the printers Pr 2 to Pr 7 to the managing printer Pr 1. Thus, the selection of the managing printer is ended.

In the case in which first printing job data is transmitted from the host computer Pc 1 to the printer Pr 2 and next second printing job data is transmitted from the host computer Pc 2 to the printer Pr 2 during the printing processing, the printer Pr 2 cannot print the second printing job data before the first printing job data is completely processed. Therefore, the printer Pr 2 transfers the second printing job data to the managing printer Pr 1 and the managing printer Pr 1 decodes the contents of the second printing job data and processes the second printing job data, that is, retransfers the second printing job data to the proper printer Pr 3 or Pr 4 belonging to the same language, while it informs the host computer Pc 2 to be a source for the second printing job data that the second printing job data is transferred to the printer Pr 3 or Pr 4. The subsequent processing of the second printing job data is carried out between the host computer Pc 2 to be the source and the printer Pr 3 or Pr 4.

FIGS. 6A is a flowchart showing a selecting processing to be executed by the managing printer in the host computer 200. When the processing is started, an application software for executing the selecting processing of the managing printer is first activated (Step S100), and a dialog box for managing printing setting is displayed on the display screen of the computer 200. Therefore, a user automatically or manually selects the managing printer (Step S101). Next, a request for the transmission of printer information is given to all the printers 100 on the network (Step S102), the transmitted printer information is received (Step S103) and it is decided whether or not automatic selection is carried out (Step S104).

If the automatic selection is carried out, the optimum printer 100 is selected as the managing printer based on the printer information transmitted from all the printers 100 . . . (Step S105). If the automatic selection is not carried out, the managing printer 100 is selected by a manual operation on the display screen (Step S106). When the managing printer 100 is selected, the host computer 200 informs the selected printer 100 that the printer 100 is selected as the managing printer, transmits the printer information of all other printers 100 . . . (Step S107) and informs the non-selected printers 100 . . . of any printer 100 which has been selected as the managing printer (Step S108). Thus, the processing is ended.

FIG. 6B is a flowchart showing a subroutine for the automatic selection of the managing printer 100. When the processing is started, the maximum number of loaded languages which can be processed by the printer 100 are formed into groups (Step S105-1), from which the group having the highest information processing speed is selected as the managing printer 100 (Step S105-2). A printer group is formed for each language which can be understood by the managing printer 100 (Step S105-3). If some printers 100 are omitted from the printer group, the managing printer 100 is further selected to form a printer group (Step S105-4). Thus, the processing is ended.

In the case in which the managing printer 100 is to be automatically selected, all the language which can be processed by the printers 100 on the network should be basically understood. However, if the condition is not met, a network for a virtual printer group is built within a limited range. In such a meaning, the processing of the flowchart shown in FIG. 6B is executed. Consequently, some managing printers 100 and a printer group using them as a center are formed on the network. A certain printer 100 has the managing printer 100 for each processable language, and might have a plurality of managing printers 100 . . . .

Figures 7A, 7B:
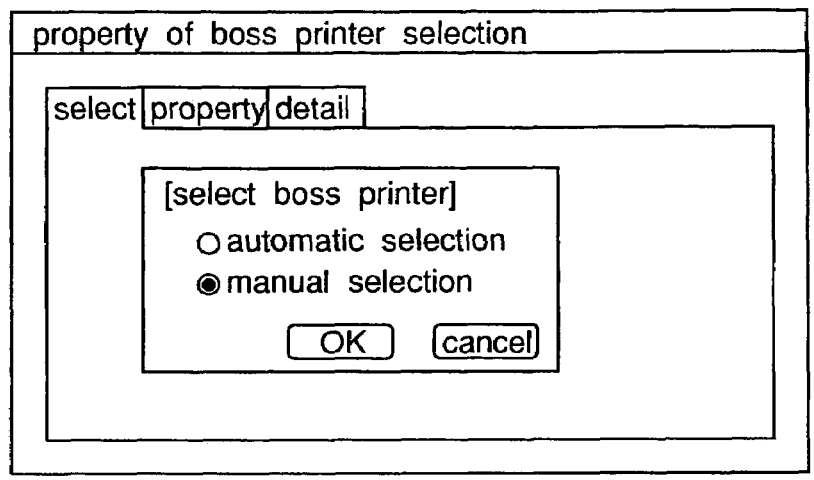
FIGS. 7A and 7B are diagrams showing two screens for the manual selection of the managing printer according to the first embodiment, respectively.

FIG. 7 shows an example of a dialog box for managing printer setting which is displayed on the display screen of the host computer 200. FIG. 7A shows a screen for selection of a managing printer selecting method. In the present example, characters of "automatic selection" and "manual selection" and buttons of "OK" and "cancel" are displayed. In this example, the "manual selection" is selected. When "OK" is clicked in this state, a screen shown in FIG. 7B is displayed.

In FIG. 7B, the screen displays the name, language, resolution, printing speed and memory size of the printer and buttons of "automatic selection", "OK" and "cancel" therebelow. When the user selects an optional printer 100 and clicks the "OK", the selected printer 100 can be set to the managing printer. In the example, the following is displayed. More specifically, a printer 1 has a support language of PCL, a resolution of 600 dpi, a printing speed of 20 ppm and a memory size of 16 MB, a printer 2 has a support language of PCL, a resolution of 1200 dpi, a printing speed of 8 ppm and a memory size of 16 MB, a printer 3 has a support language of PCL, a resolution of 600 dpi, a printing speed of 16 ppm and a memory size of 8 MB, a printer A has a support language of PS, a resolution of 600 dpi, a printing speed of 20 ppm and a memory size of 16 MB, a printer B has a support language of PS, a resolution of 1200 dpi, a printing speed of 16 ppm and a memory size of 32 MB, and a printer C has a support language of PS/PCL, a resolution of 1200 dpi, a printing speed of 20 ppm and a memory size of 32 MB. The printer C is selected as the managing printer.

Figure 8:
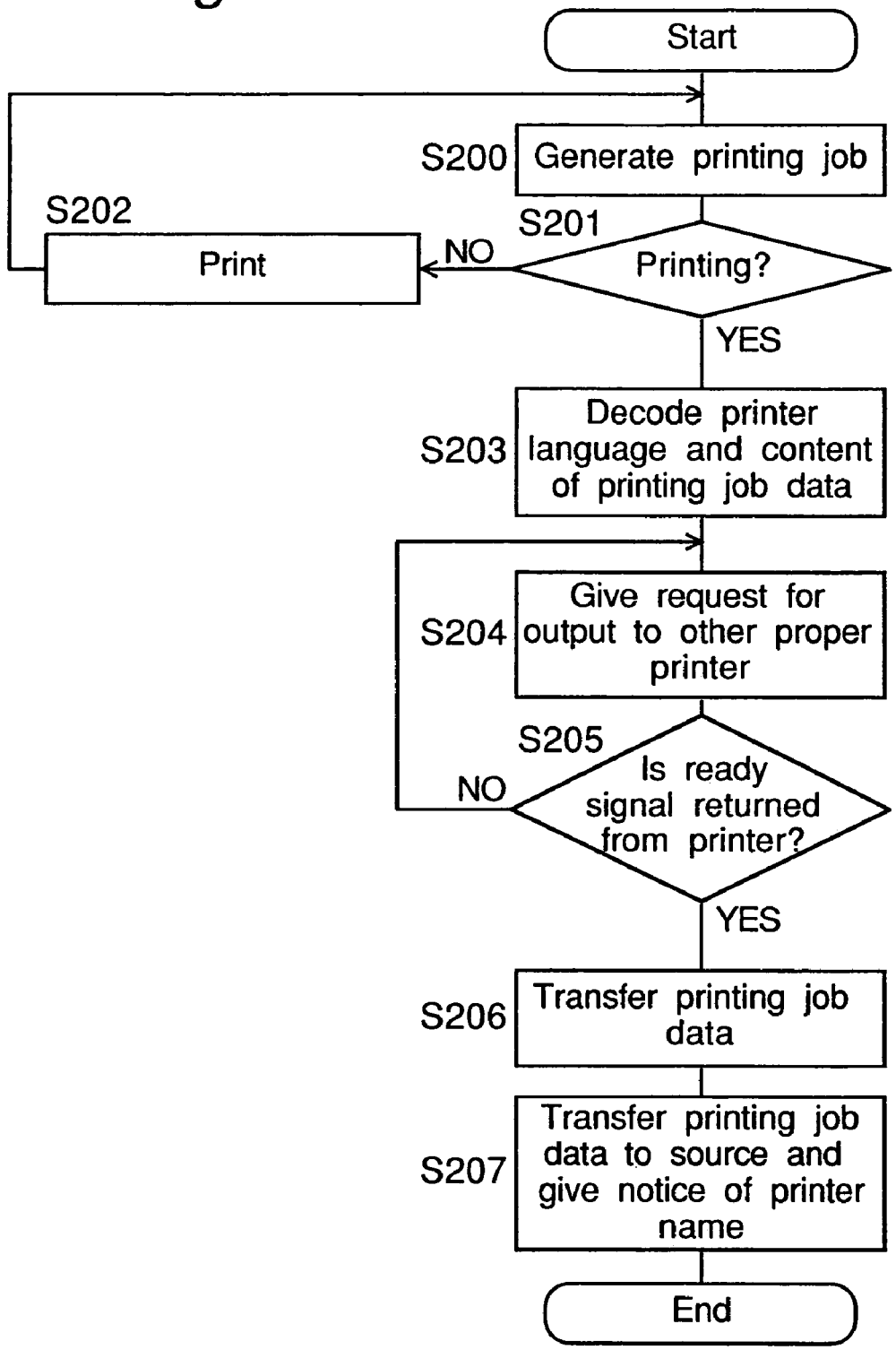
FIG. 8 is a flowchart showing a printing processing to be executed by the managing printer according to the first embodiment.

FIG. 8 is a flowchart showing a printing processing in the managing printer 100. When the processing is started, printing job data is received from the host computer 200 (Step S200) and it is decided whether or not a printing operation is being carried out (Step S201). If the printing operation is not being carried out, the printing operation is executed based on the received printing job data (Step S202). On the other hand, if the printing operation is being carried out, the printer language and contents of the printing job data are decoded (Step S203). Depending on the result of the decoding, a request for the printing operation is given to the other proper printer 100 and it is decided whether or not a ready signal indicative of the execution of the printing operation is returned from the printer 100 (Steps S204 and S205) The processing is repeated until the ready signal is returned. When the ready signal is returned, the printing job data is transferred to the printer 100 and the host computer 200 to be a source for a printing job signal is informed of the printer 100 to be a transfer destination (Steps S206 and S207). Thus, the processing is ended. Subsequently, the printing job data processing is carried out between the host computer 200 to be the source and the printer 100 to be the transfer destination.

Figure 9:
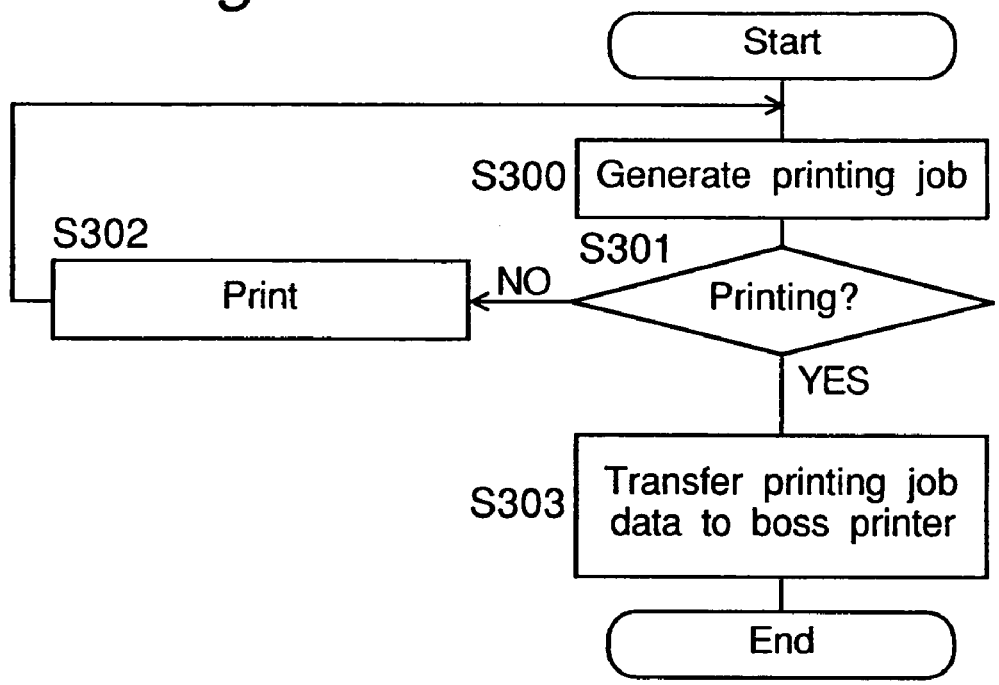
FIG. 9 is a flowchart showing a printing processing to be executed by an ordinary printer according to the first embodiment.

FIG. 9 is a flowchart showing a printing processing in the ordinary printer 100. When the processing is started, printing job data is received from the host computer 200 (Step S300).

It is decided whether or not the printing operation is being carried out (Step S301). If the printing operation is not being carried out, the printing operation is executed based on the received printing job data (Step S302). On the other hand, if the printing operation is being carried out, the printing job data is transferred to the managing printer 100 (Step S303). Thus, the processing is ended.

Figure 10:
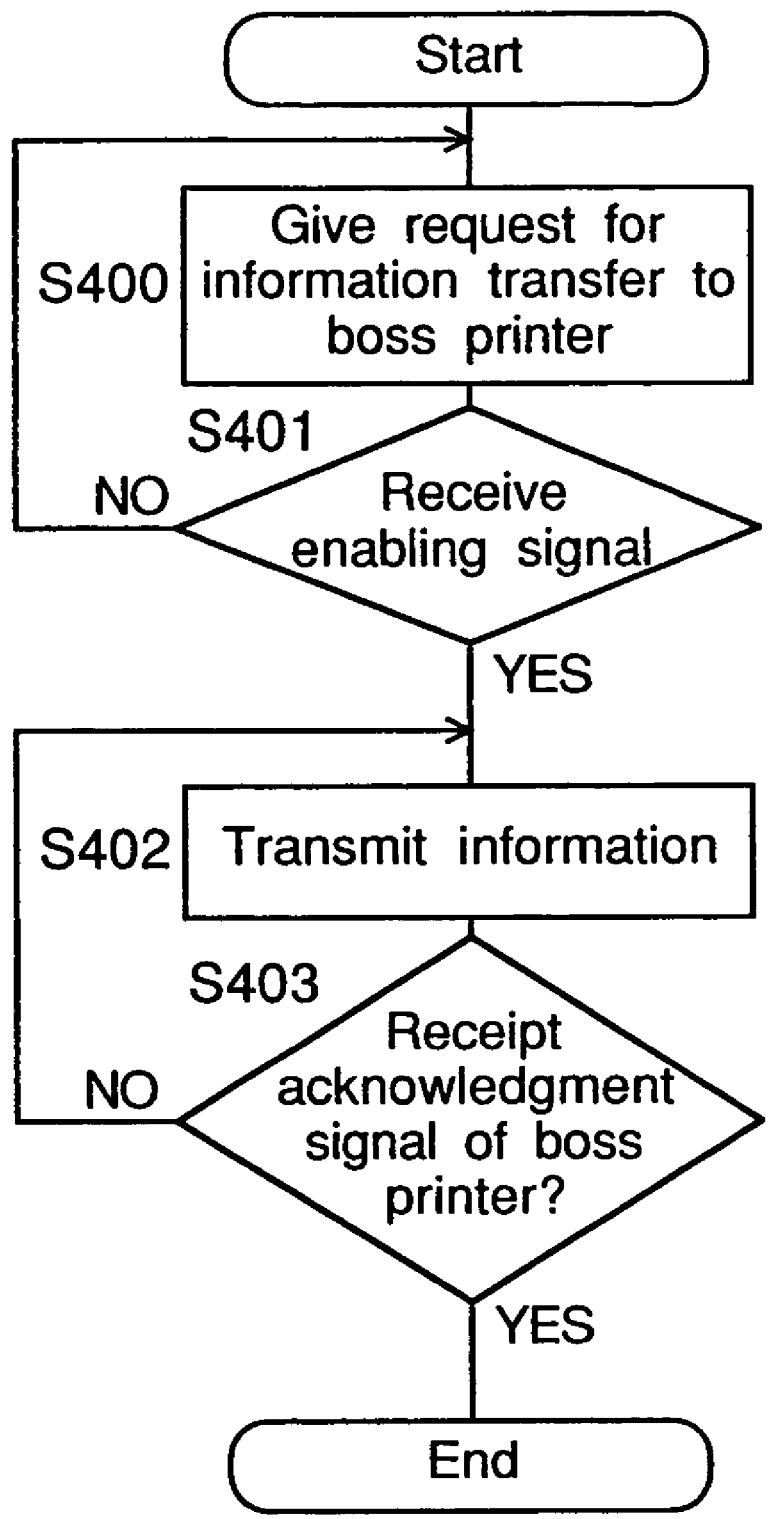
FIG. 10 is a flowchart showing a printer information updating processing to be executed by the ordinary printer according to the first embodiment.

FIG. 10 is a flowchart showing the information updating processing of the printer 100. For example, if a memory is additionally provided or the receipt of the printing job data is changed, the processing is started to send a request signal (Req) for information transfer to the managing printer 100 (Step S400). It is decided whether or not an enabling signal (Acq) is received from the managing printer 100 (Step S401). The above-mentioned processing is repeated until the enabling signal is received. When the enabling signal is received, information is transmitted to the managing printer 100 (step S402). It is decided whether or not a receipt acknowledgment signal is received from the managing printer 100 (Step S403). The processing is repeated until the receipt acknowledgment signal is received. When the receipt acknowledgment signal is received, the processing is ended. Thus, the printer 100 informs the managing printer 100 of the contents of the change of its own printer information if any, and the managing printer 100 always holds the latest printer information.

Figure 11:
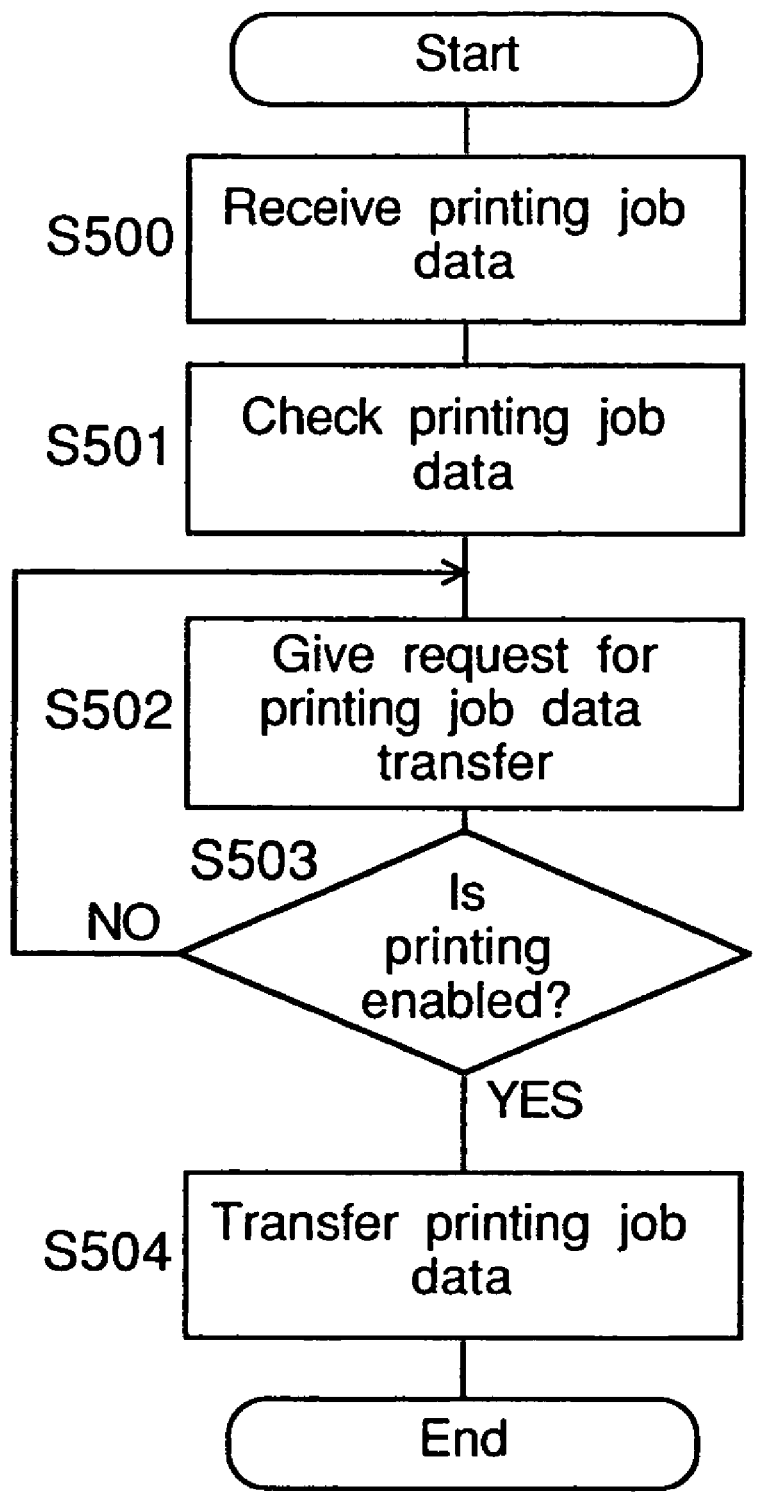
FIG. 11 is a flowchart showing a transfer destination printer determining processing to be executed by the managing printer according to the first embodiment.

FIG. 11 is a flowchart showing a transfer destination printer determining processing in the managing printer 100. When the managing printer 100 receives printing job data from the other printer 100 (Step S500), the printing job data is decoded and the printer information of each printer 100 is read out (Step S501). The printer 100 having the lowest processing capability which can print the printing job data received from the printer information is determined as a transfer destination printer and a request for the transfer of the printing job is transmitted to the printer 100 (Step S502). When an enabling signal indicating that the printer 100 can perform the printing operation is returned, the printing job data is transferred to the determined printer 100 (Step S504). Thus, the processing is ended. The printer 100 having the lowest processing capability is determined as the transfer destination printer in order to cope with the case in which new printing job data requires a high processing capability if any.

FIG. 12 shows an example of the procedure to be executed when the printer information and the managing printer 100 determine the transfer destination printer. In the example, a printer 1 has a support language: PCL 6, color/black and white: color, a paper: A4/A3, a resolution: 1200 dpi, a memory capacity 32 MB and a printing speed: 3 ppm, a printer 2 has a support language PCL 6, color/black and white: black and white, a paper A4/A3, a resolution: 1200 dpi, a memory capacity 32 MB and a printing speed: 20 ppm, a printer 3 has a support language PCL 5e, color/black and white color, a paper: A4, a resolution: 600 dpi, a memory capacity: 16 MB and a printing speed 3 ppm, a printer 4 has a support language: PCL 5e, color/black and white black and white, a paper A3, a resolution 600 dpi, a memory capacity 16 MB and a printing speed 8 ppm, a printer 5 has a support language PCL 6, color/black and white: black and white, a paper: A4/A3, a resolution: 600 dpi, a memory capacity: 32 MB and a printing speed: 16 ppm, a printer 6 has a support language: PCL 6, color/black and white: black and white, a paper: A4/A3, a resolution: 1200 dpi, a memory capacity 16 MB and a printing speed: 16 ppm, a printer 7 has a support language PCL 6, color/black and white: black and white, a paper: A4, a resolution: 600 dpi, a memory capacity: 8 MB and a printing speed: 20 ppm, a printer 8 has a support language: PCL 6, color/black and white: black and white, a paper A4, a resolution: 600 dpi, a memory capacity 16 MB and a printing speed: 8 ppm, and a printer 9 has a support language: PCL 5e, color/black and white: black and white, a paper: A4, a resolution: 600 dpi, a memory capacity: 8 MB and a printing speed: 8 ppm. The printer 1 acts as the managing printer. All the printers 1 to 9 have equal fonts.

In the case in which the printing job data is transferred from the printer 7 to the managing printer 1 and the printing job data has the contents of PCL 6, black and white, A4 and 600 dpi, a candidate for the transfer destination printer is printers 2, 6 and 8 based on the printer language. The printer 8 has the lowest processing capability of the three printer. Therefore, the managing printer 1 transfers the printing job data to the printer 8, thereby executing the processing.

Second Embodiment

While the printer Pr 1 for supporting two kinds of languages, for example, PCL and PS has been used as the managing printer to manage a printer group of both languages in common in the above-mentioned embodiment, one managing printer may be provided in a printer group for each language.

Figure 13A:
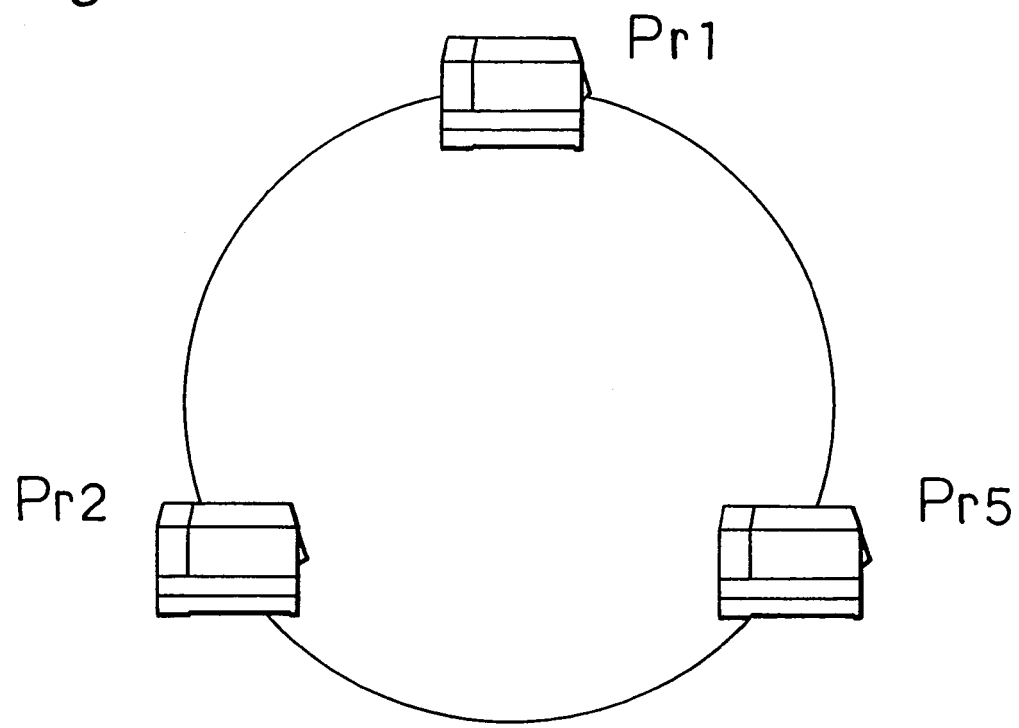
FIGS. 13A and 13B are views showing two printer groups formed according to the a second embodiment of the present invention, respectively.
Figure 13B:
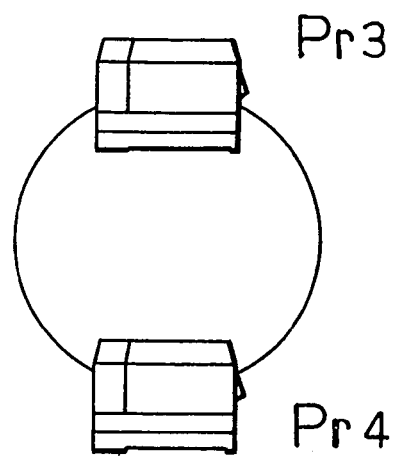

FIG. 13 shows an example of a grouping processing of such printers 100 . . . . When one of the printers 100 . . . is turned ON, it broadcasts its own printer capability information, more specifically, a support language, a data processing capability and the like with respect to the other printers 100 of the same work group which are connected through a network line 300. The data processing capability implies a printing speed, a MIPS value of a CPU 113 and a memory size of a loaded memory 112. The printer 100 receiving the printer capability information broadcasts its own printer capability information on all the printers 100. Accordingly, all the printers 100 temporarily hold support languages, data processing capabilities and the like of all the printers 100 . . . in a network.

Next, each of the printers 100 . . . decides whether or not its own processing capability is the highest in the printers 100 . . . for supporting the same language as the support language. If its own processing capability is the highest, all other printers 100 . . . for supporting the same language are stored as managing printers. If its own data processing capability is not the highest, a printer having the highest processing capability is stored as the managing printer. Moreover, in the case in which there are a plurality of printers 100 having the same processing capability, the printer 100 having a low network address can act as the managing printer.

For example, a printer Pr 1 has a support language PCL, a printing speed: 20 ppm, a MIPS value of the CPU 113: 100 mips and a loaded memory size: 32 MByte, a printer Pr 2 has a support language: PCL, a printing speed 8 ppm, a MIPS value of the CPU 113: 70 mips and a loaded memory size: 8 MByte, a printer Pr 3 has a support language: PS, a printing speed 20 ppm, a MIPS value of the CPU 113: 90 mips and a loaded memory size 20 MByte, a printer Pr 4 has a support language: PS, a printing speed: 8 ppm, a MIPS value of the CPU 113: 80 mips and a loaded memory size 8 MByte, and a printer Pr 5 has a support language: PCL, a printing speed: 18 ppm, a MIPS value of the CPU 113: 100 mips and a loaded memory size 20 MByte.

When the printer Pr 1 is turned ON, it transmits its own printer capability information (a support language PCL, a printing speed: 20 ppm, a MIPS value of the CPU 113: 100 mips and a loaded memory size: 32 MByte) to all other printers Pr 2 to Pr 5. The other printers Pr 2 to Pr 5 receiving the capability information of the printer Pr 1 also transmit their own capability information to all other printers Pr 1 to Pr 5. Each of the printers Pr 1 to Pr 5 holds all other capability information.

Next, each of the printers Pr 1 to Pr 5 is formed into groups by the support language. For example, the printers Pr 1, Pr 2 and Pr 5 are formed into groups for the support language PCL and the printers Pr 3 and Pr 4 are formed into groups for the support language PS. In the same language group, the printers Pr, 1 Pr 2 and Pr 5 or the printers Pr 3 and Pr 4 compare their own data processing capabilities with those of the other printers. In the present example, the printers Pr 1 and Pr 3 have the highest processing capabilities for the support languages PCL and PS respectively, and therefore, they act as managing printers to store other same language printer Pr 2, Pr 5 or Pr 4, while the other same language printer Pr 2, Pr 5 or Pr 4 stores, as the managing printer, the printer Pr 1 or Pr 3. As a result, the printers in the network can be conceptually classified into a printer group having the support language PCL shown in FIG. 13A and a printer group having the support language PS shown in FIG. 13B.

Figures 14A, 14B:
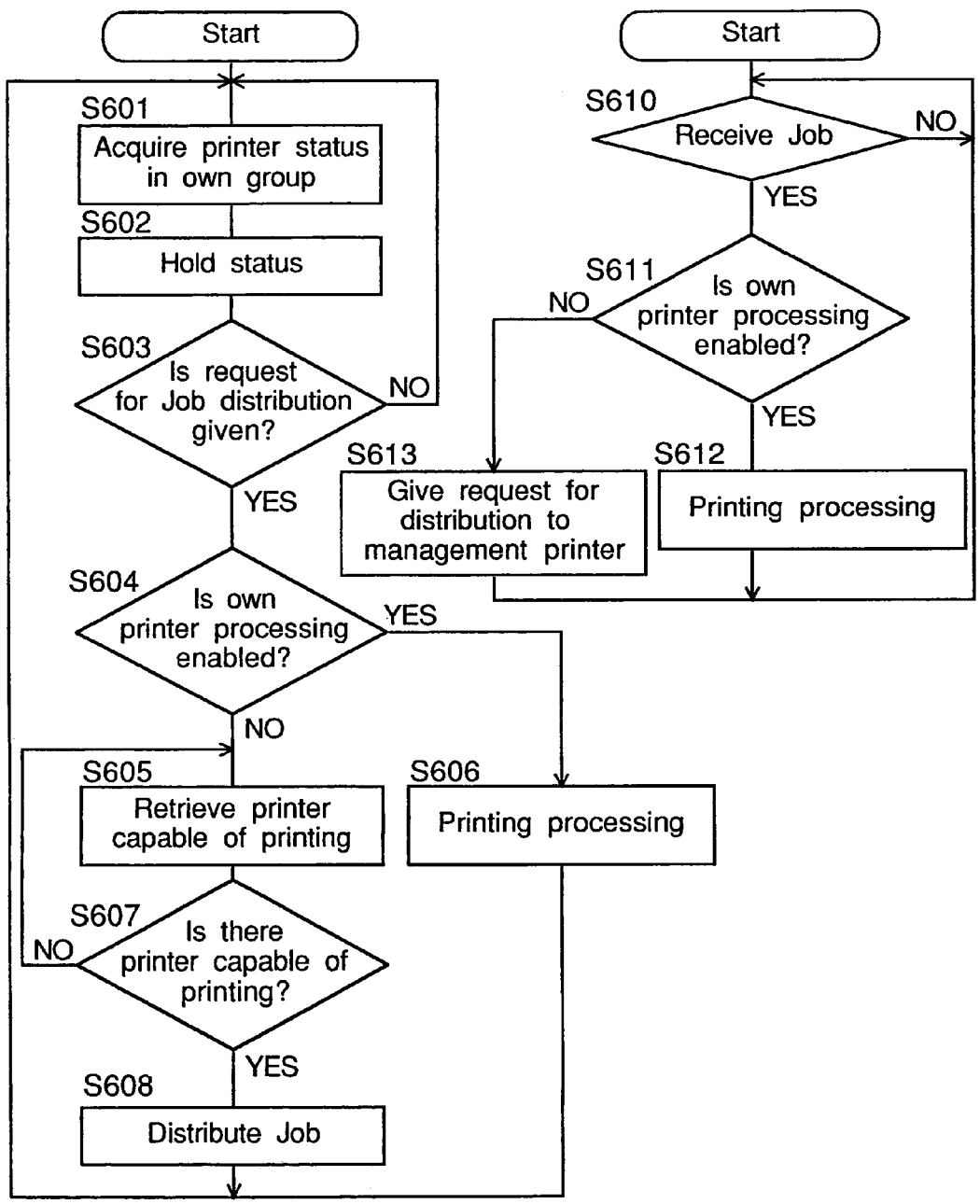
FIGS. 14A and 14B are flowcharts showing processings to be executed by a managing printer and a managed printer, respectively.

FIG. 14 is a flowchart showing a processing of distributing printing job data. As shown in FIG. 14A, first of all, when the processing is started in the managing printer 100, a status signal generated regularly or irregularly from the printer 100 belonging to its own language group is received and it is decided whether or not the status signal includes a request for job distribution (Step S603). The above mentioned processings (Steps S601 to S603) are repeated until the request for job distribution is given.

When the request for job distribution is given, it is decided whether or not the managing printer 100 can carry out a printing processing by itself (Step S604). If the managing printer 100 can carry out the printing processing by itself, the printing operation is executed based on printing job data (Step S606). If the managing printer 100 cannot carry out the printing processing by itself, the printer 100 capable of executing the printing operation is retrieved (Steps S605 and S607). The printing job data is distributed to the retrieved printer 100 (Step S608). Thus, the processing is ended.

On the other hand, as shown in FIG. 14B, a standby state is set until the printing job data is received in the ordinary printer 100 (Step S610). If the printing job data is received, it is decided whether or not the printer 100 can carry out the printing processing by itself, that is, a large number of jobs are cued, whether or not a printer error is made during the execution of the printing job or the shortage of a paper is caused or the like (Step S611). If the printer 100 can carry out the printing processing, the printing operation is executed based on the printing job data (Step S612). If the printer 100 cannot carry out the printing processing, a request for job distribution and the printing job data are transmitted to the managing printer 100 (Step S613). Thus, the processing is ended.

For example, as shown in FIG. 13, in the case in which the languages PCL and PS are present together as printer languages in the printers Pr 1 to Pr 5 which are network connected, the managing printers Pr 1 and Pr 3 are selected for each language group. The managing printers Pr 1 and Pr 3 store printers in their own language groups, that is, the managing printer Pr 1 stores the printers Pr 2 and Pr 5 and the managing printer Pr 3 stores the printer Pr 4. The printer Pr 2, Pr 5 or Pr 4 gives a notice of its own state (status), at any time, to the managing printers Pr 1 and Pr 3 of the language group to which the printer itself belongs.

When the printer Pr 2 is set in a state in which the printing operation can be carried out and the printing job data is received in the printer group having the support language PCL, the printer Pr 2 carries out a normal printing operation.

On the other hand, in the case in which the printer Pr 2 cannot carry out the printing operation due to error generation or the like, a request for job distribution is transmitted to the managing printer Pr 1 and the printing job data is transferred when the printer Pr 2 receives the printing job data. In the case in which the managing printer Pr 1 can carry out the printing operation by itself, it executes the printing operation based on the printing job data. In the case in which the managing printer Pr 1 cannot carry out the printing operation by itself, it distributes the printing job data to the printer Pr 5 having the same support language which is stored. The printer Pr 5 which can carry out the printing operation executes the printing processing based on the printing job data.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A printing system comprising:
   at least one information processing apparatus; and
   a plurality of printing apparatuses,
   wherein the at least one information processing apparatus comprises a transmitter configured to transmit print job data via a network to at least one of the plurality of punting apparatuses,
   and wherein each one of the plurality of printing apparatuses comprises:
   a receiver configured to receive device information of the plurality of printing apparatuses via the network;
   an image forming device configured to form an image based on print job data received from the information processing apparatus;
   a transmitter configured to transmit device information of the printing apparatus itself via the network to the plurality of printing apparatuses;
   wherein each one of the plurality of printing apparatuses is configured to automatically specify at least one of the plurality of printing apparatuses other than itself as at least one constituent of a group into which that printing apparatus itself belongs, based on the device information received by the receiver from the plurality of printing apparatuses and device information of that printing apparatus itself.

2. A printing system according to claim 1, wherein the receiver is configured to receive device information from at least one of the plurality of printing apparatuses and to transmit device information to at least one of the plurality of printing apparatuses.

3. A printing system according to claim 1, wherein the transmitter is configured to transmit device information to at least one of the plurality of printing apparatuses when the printing apparatus comprising the transmitter is turned on with a power source.

4. A printing system according to claim 1, wherein at least one of the plurality of printing apparatuses is configured to receive device information from at least one of the plurality of printing apparatuses and to transmit the received device information to at least one of the plurality of printing apparatuses when the printing apparatus comprising the transmitter is turned on with a power source.

5. A printing system according to claim 1, wherein the transmitter is configured to broadcast device information received from at least one of the plurality of printing apparatuses.

6. A printing system according to claim 1, wherein each of the plurality of printing apparatuses is configured to designate a managing printing apparatus in at least one of the groups based on device information received from at least one of the plurality of printing apparatuses.

7. A printing system according to claim 6, wherein the managing printing apparatus comprises a storage device configured to store device information descriptive of at least one printing apparatus in the group in which the managing printing apparatus is designated.

8. A printing system according to claim 6, wherein at least one of the printing apparatuses is configured to store information descriptive of the managing printing apparatus if it is not selected as the managing printing apparatus.

9. A printing system according to claim 8, wherein at least one of the printing apparatuses comprises a notifier configured to notify another printing apparatus of its device status when the other apparatus is not selected as the managing printing apparatus.

10. A printing system according to claim 1, wherein the device information comprises information descriptive of at least one capability or feature of the printing apparatus.

11. A printing apparatus connected via a network to a plurality of printing apparatuses and to at least one information processing apparatus, the printing apparatus comprising:
a receiver configured to receive device information of at least one of the plurality of printing apparatuses via the network;
an image forming device configured to form an image based on print job data received by the receiver from the at least one information processing apparatus;
a transmitter configured to transmit device information of the printing apparatus itself via the network; and
wherein the printing apparatus is configured to automatically specify at least one of the plurality of printing apparatuses other than itself as at least one constituent of a group into which that printing apparatus itself belongs, based on the device information received by the receiver from the plurality of printing apparatuses and device information of that printing apparatus itself.

12. A printing apparatus according to claim 11, wherein the receiver is configured to receive device information descriptive of a second printing apparatus from a second printing apparatus and the transmitter is configured to transmit device information to the second printing apparatus.

13. A printing apparatus according to claim 11, wherein the transmitter is configured to transmit device information to at least one of the plurality of printing apparatuses when the printing apparatus comprising the transmitter is turned on with a power source.

14. A printing apparatus according to claim 11, wherein at least one of the plurality of printing apparatuses is configured to receive device information from at least one of the plurality of printing apparatuses and to transmit the received device information to at least one of the plurality of printing apparatuses when the printing apparatus comprising the transmitter is turned on with a power source.

15. A printing apparatus according to claim 11, wherein the transmitter is configured to broadcast the device information of the printing apparatus comprising the transmitter.

16. A printing apparatus according to claim 11, wherein the printing apparatus is configured to select a managing printing apparatus in at least one of the groups based on the device information received from at least one of the plurality of printing apparatuses.

17. A printing apparatus according to claim 16, wherein the printing apparatus comprises a storage device configured to store device information descriptive of at least one printing apparatus in the group to which the managing printing apparatus belongs if the printing apparatus is designated as the managing printing apparatus.

18. A printing apparatus according to claim 16, wherein the printing apparatus comprises a storage device configured to store information descriptive of the managing printing apparatus if it is not selected as the managing printing apparatus.

19. A printing apparatus according to claim 18, wherein the printing apparatus comprises a notifier configured to notify another printing apparatus of its device status when the other apparatus is not selected as the managing printing apparatus.

20. A printing apparatus according to claim 11, wherein the device information comprises information descriptive of at least one capability or feature of the printer apparatus.

21. A method for controlling a printing apparatus connected via a network to a plurality of networked printing apparatuses and at least one networked information processing apparatus, for forming an image based on a print job, the method comprising:
transmitting device information descriptive of the printing apparatus itself;
receiving device information via the network from at least one of the networked printing apparatuses; and
wherein the printing apparatus automatically specifies at least one of the plurality of printing apparatuses other than itself as at least one constituent of a group into which that printing apparatus itself belongs, based on the device information received by the receiver from the plurality of printing apparatuses and device information of that printing apparatus itself.

22. A method according to claim 21, further comprising transmitting device information from the printing apparatus to a second networked printing apparatus when device information is received from a third networked printing apparatus.

23. A method according to claim 21, further comprising transmitting the device information descriptive of the printing apparatus via the network to the plurality of networked printing apparatuses when the printing apparatus comprising the transmitter is turned on with a power source.

24. A method according to claim 21, further comprising receiving device information at the printing apparatus from a second networked printing apparatus and transmitting the received device information to a third networked printing apparatus when the printing apparatus comprising the transmitter is turned on with a power source.

25. A method according to claim 21, further comprising broadcasting the device information descriptive of the printing apparatus.

26. A method according to claim 21, wherein a managing printing apparatus is selected in at least one of the groups based on the device information received from at least one of the plurality of printing apparatuses.

27. A method according to claim 26, further comprising storing in the printing apparatus device information descriptive of at least one printing apparatus in the group to which the managing printing apparatus belongs if the printing apparatus is designated as the managing printing apparatus.

28. A method according to claim 26, further comprising storing device information descriptive of the managing printing apparatus in response to selection of a printing apparatus as the managing printing apparatus.

29. A method according to claim 28, further comprising notifying the printing apparatus of its status as a non-managing printing apparatus when the apparatus is not selected as a managing printing apparatus.

30. A method according to claim 21, wherein the device information comprises information descriptive of at least one capability or feature of the printer apparatus.

31. The printing system according to claim 1, wherein a printing apparatus is specified as a constituent of the group if the printing apparatus can print a print job which can be printed by the printing apparatus itself.

32. The printing apparatus according to claim 11, wherein a printing apparatus is specified as a constituent of the group if the printing apparatus can print a print job which can be printed by the printing apparatus itself.

33. The method of claim 21, wherein a printing apparatus is specified as a constituent of the group if the printing apparatus can print a print job which can be printed by the printing apparatus itself.

* * * * *

UNITED STATES PATENT AND TRADEMARK OFFICE
CERTIFICATE OF CORRECTION

PATENT NO. : 7,593,123 B2
APPLICATION NO. : 11/345290
DATED : September 22, 2009
INVENTOR(S) : Yoshinori Sugahara It is certified that error appears in the above-identified patent and that said Letters Patent is hereby corrected as shown below:

On the title page:

Item (75), "Inventor," please replace "Itami" with --Kyoto--.

Column 10:

In Claim 1, line 31, please replace "punting" with --printing--.

Signed and Sealed this

Tenth Day of November, 2009

David J. Kappos
*Director of the United States Patent and Trademark Office*